United States Patent [19]
Miyashita et al.

[11] Patent Number: 5,592,456
[45] Date of Patent: Jan. 7, 1997

[54] INFORMATION REPRODUCING APPARATUS AND METHOD

[75] Inventors: Akira Miyashita, Tokorozawa; Takaaki Ashinuma, Yokohama, both of Japan

[73] Assignee: Canon Kabushiki Kaisha, Tokyo, Japan

[21] Appl. No.: 354,114

[22] Filed: Dec. 6, 1994

[30] Foreign Application Priority Data

Dec. 10, 1993 [JP] Japan .................................. 5-310599

[51] Int. Cl.$^6$ ............................................. G11B 7/00
[52] U.S. Cl. .............................. 369/59; 369/50; 369/48; 360/48; 360/51
[58] Field of Search ........................... 369/59, 47, 48, 369/49, 50, 54, 58, 60, 32, 124; 360/48, 51

[56] References Cited

U.S. PATENT DOCUMENTS

| 5,204,848 | 4/1993 | Cardero et al. .................... 369/59 X |
| 5,388,087 | 2/1995 | Saiki et al. ........................ 369/50 X |
| 5,396,479 | 3/1995 | Johann .............................. 369/59 |

FOREIGN PATENT DOCUMENTS

| 232181 | 8/1987 | European Pat. Off. . |
| 0606478 | 7/1994 | European Pat. Off. . |
| 5-040978 | 2/1993 | Japan . |
| 9307614 | 4/1993 | Japan . |

OTHER PUBLICATIONS

The Transactions of the Institute of Electronics, Information and Comm. Engineers, vol. E74, No. 4, Apr. 1991 Tokyo, pp. 951–954, XP 000241319.
T. Maeda et al. "High speed, large capacity optical disk using pit–edge recording and MCAV method".
Patent Abstracts of Japan, vol. 12, No. 151 (P–699), May 11, 1988 & JP-A-62 267975 (Matsushita Electric Ind Co.) Nov. 20, 1987.

*Primary Examiner*—Muhammad N. Edun
*Attorney, Agent, or Firm*—Fitzpatrick, Cella, Harper & Scinto

[57] ABSTRACT

There is an information reproducing apparatus having a first comparator for comparing a reproduction signal from an information recording medium such as a magnetooptical disc and a first reference signal, thereby binarizing the reproduction signal, a clock signal generating circuit for generating a clock signal from the signal binarized by the first comparator, and a synchronous circuit for synchronizing the binary signal by the clock signal. A phase comparator compares the phase of the binary signal and the phase of the output of the synchronous circuit, a charge/discharge circuit such as a charge pump circuit is driven by an output of the phase comparator, and a second comparator compares an output of the charge/discharge circuit and a second reference signal. The first reference signal is controlled by an output of the second comparator synchronously with the binary signal or the output of the synchronous circuit. The second reference signal changes interlockingly with a change in frequency of the clock signal forming circuit.

18 Claims, 15 Drawing Sheets

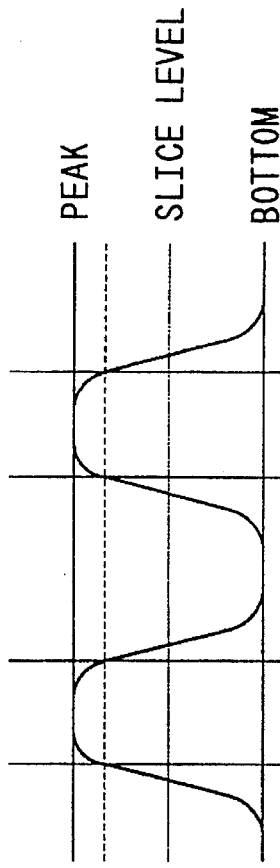
FIG. 1A EXCESSIVE OUTPUT
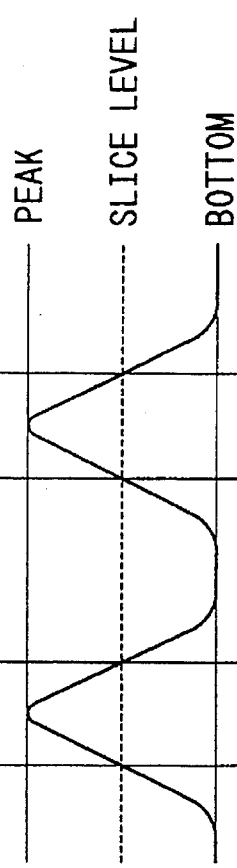
FIG. 1B PROPER OUTPUT
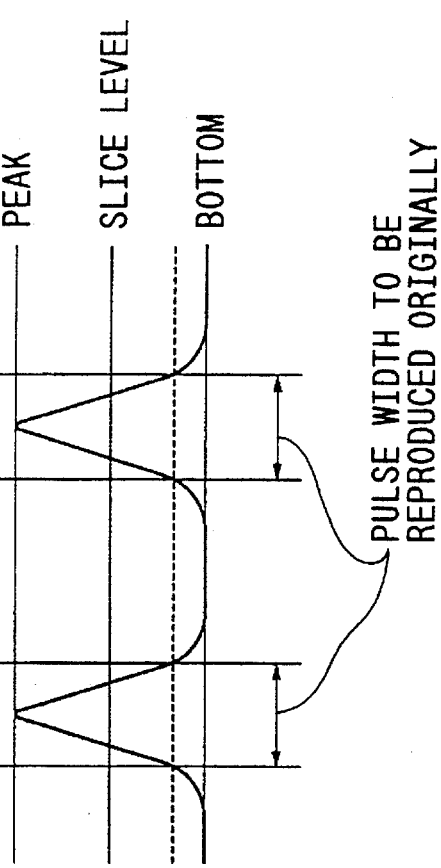
FIG. 1C UNDER OUTPUT

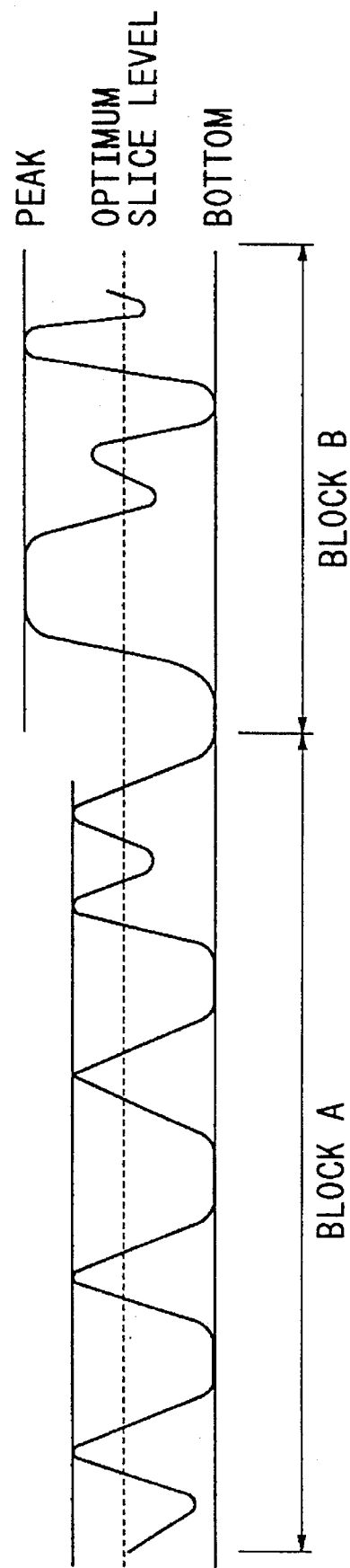

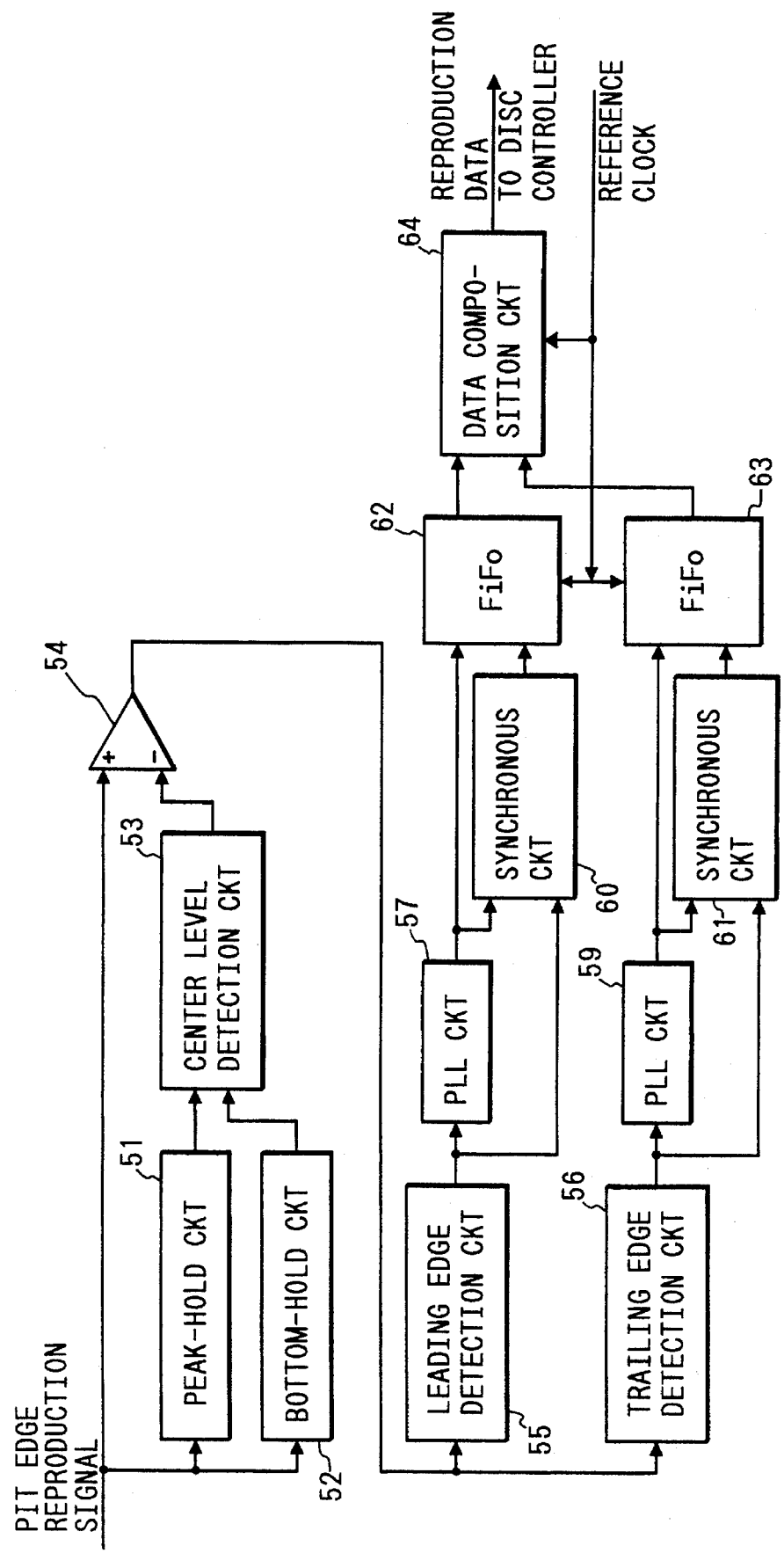

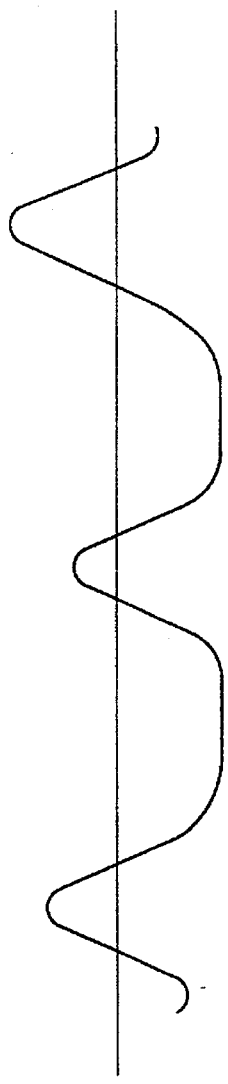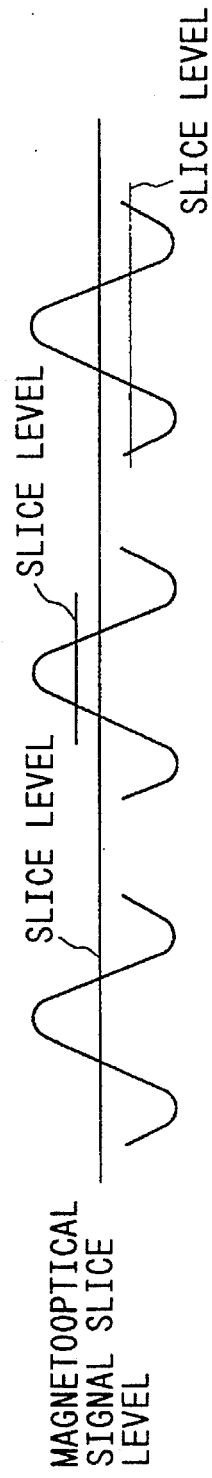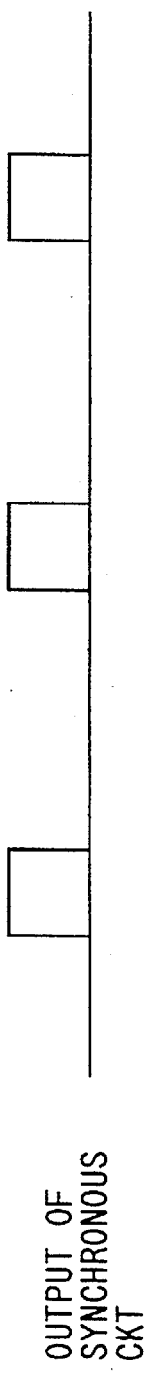
FIG. 5A MAGNETOOPTICAL SIGNAL
FIG. 5B MAGNETOOPTICAL SIGNAL SLICE LEVEL
FIG. 5C OUTPUT OF BINARIZING CKT
FIG. 5D SYNCHRONOUS CLOCK
FIG. 5E OUTPUT OF SYNCHRONOUS CKT

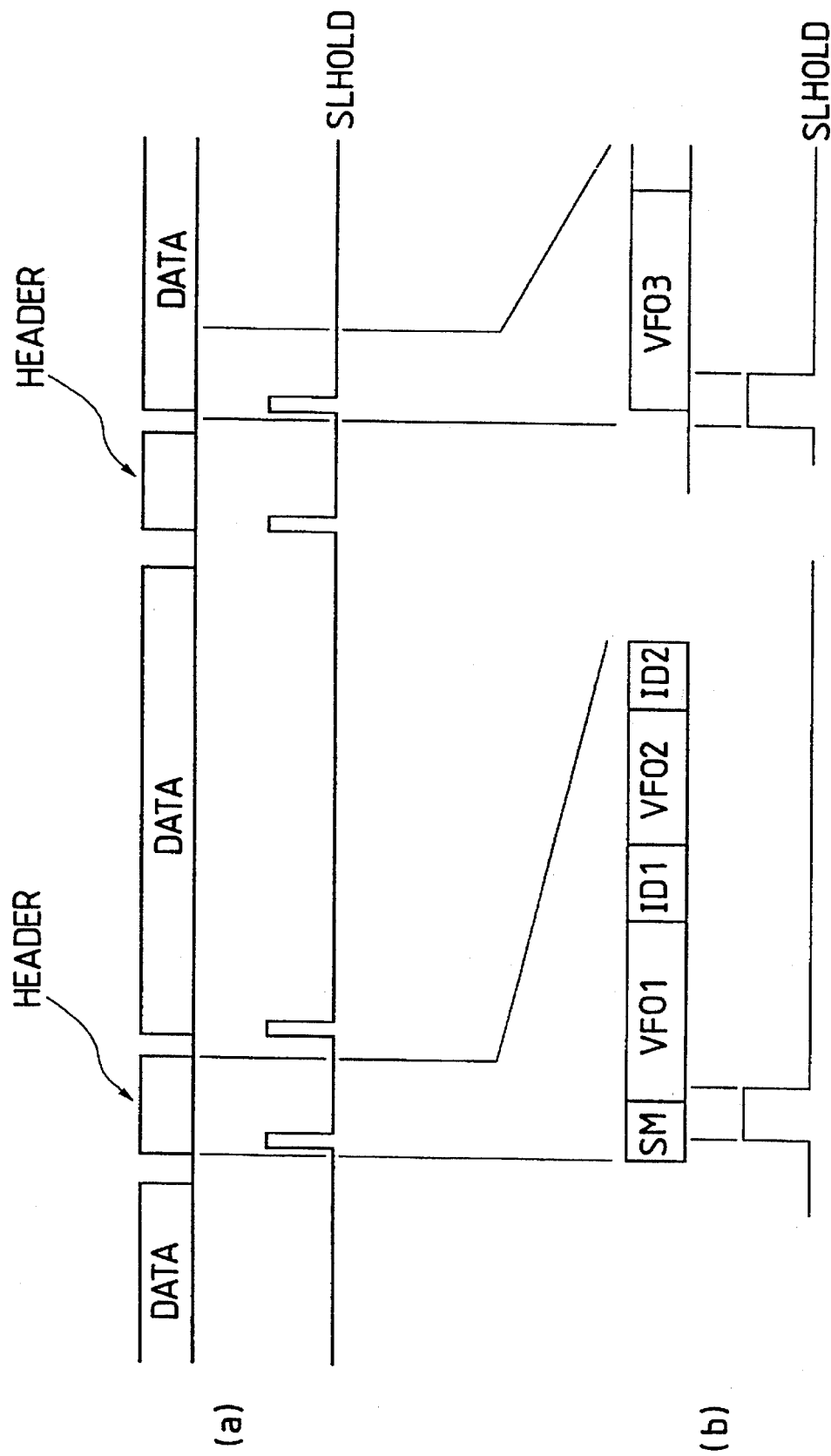

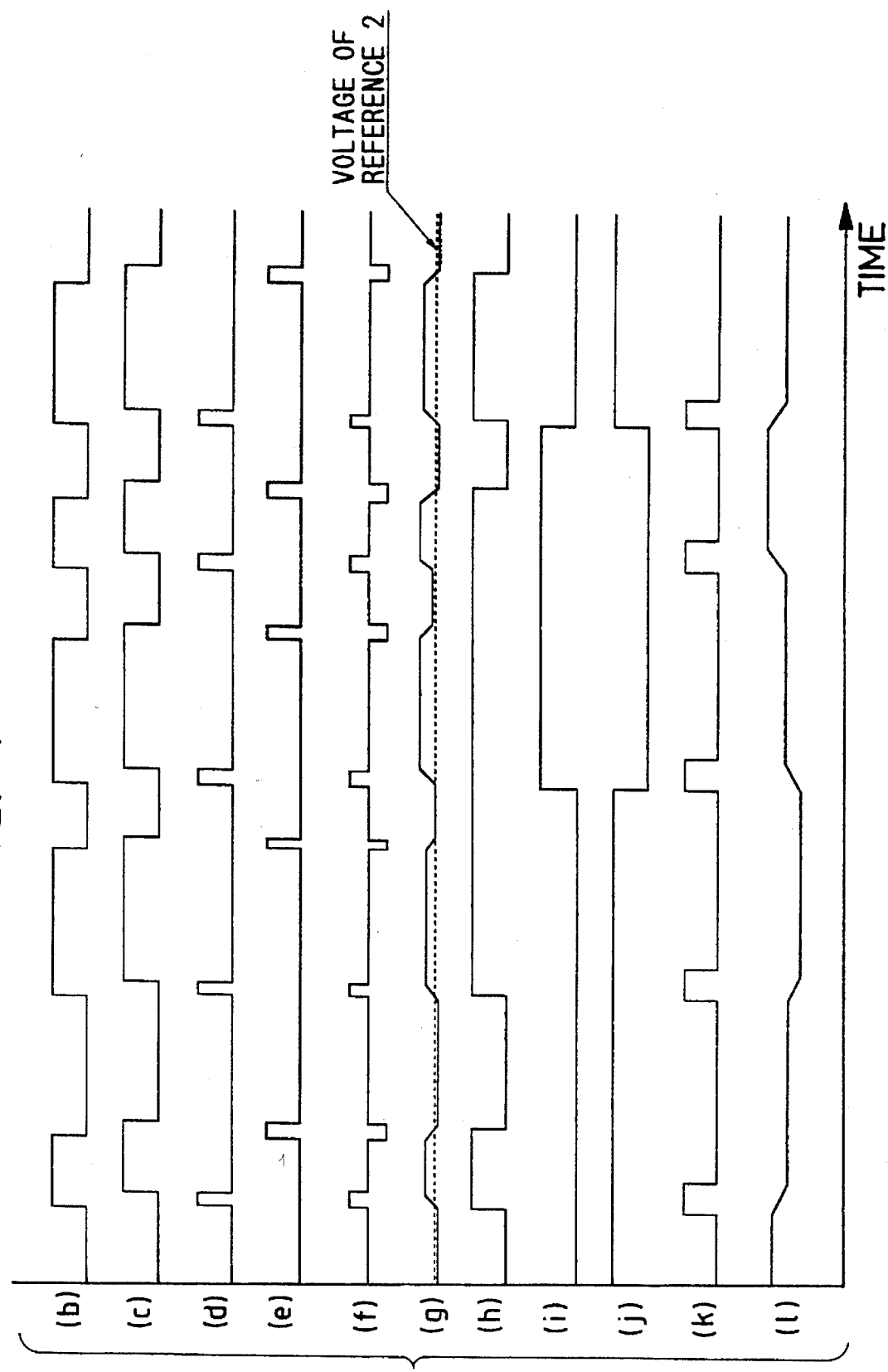

INFORMATION REPRODUCING APPARATUS AND METHOD

BACKGROUND OF THE INVENTION

1. Field of the Invention

The present invention relates to an optical information reproducing apparatus for binarizing a reproduction signal from an optical information recording medium.

2. Related Background Art

In recent years, optical recording media such as optical discs and the like are rapidly being advanced as types of memory of high density and large capacity, including a rewritable magnetooptical disc as well as a read-only CD and a write-once type disc. Particularly, the magnetooptical disc is proving useful as an external memory of high density and large capacity for use with a computer. In association with the large capacity of the disc apparatus, as means for increasing the memory capacity by effectively using the possible recording density on a disc, hitherto, there has been used what is called a mark position recording, wherein each bit of one polarity (say, "1") is recorded as a pit of a single length. In recent years, however, what is called mark edge, in which a higher density is realized by providing information for edges on both sides of a pit, is becoming the main stream approach.

In such an optical disc, since the information has been recorded at a high density, it is required to accurately read out the recorded information upon reproduction. In the approach used hitherto, after magnetooptical signals read out from two photosensors are amplified by a preamplifier, a difference signal between outputs of the two sensors is formed, the peak value and the bottom value of the difference signal are further detected, and the difference signal is sliced at the center value of the peak and bottom values and is binarized, thereby reproducing the magnetooptical signal. However, in a case where the recording conditions are changed due to the following causes or the apparatus is influenced from the outside, the level of the reproduction signal fluctuates, so that there is a case where the magnetooptical signal cannot be accurately reproduced:

(1) In the magnetooptical disc apparatus, the writing level of the magnetooptical signal differs for every apparatus.

(2) In the magnetooptical disc apparatus, the writing level of the magnetooptical signal differs for every disc, and the writing level also differs in dependence on the position on the disc.

(3) In a case where dust is deposited on the magnetooptical disc or the disc becomes dirty, the reproduction signal level complicatedly fluctuates.

(4) Waveform interference occurs due to the high density recording.

(5) The apparatus is influenced by the DC component in dependence on a modulating system (for example, 1–7 modulation).

FIGS. 1A to 1C are waveform diagrams showing changes in reproduction signal when a writing level of a magnetooptical signal is changed. FIG. 1A shows the reproduction signal written at an excessive level. FIG. 1B shows the reproduction signal written at a proper level. FIG. 1C shows the reproduction signal written at too low a level. As will be obviously understood from those diagrams, in the case where the signal was written at the excessive or too low level, the slice level to be set at the center value of the peak and bottom values is improper, so that the pulse width that ought to be reproduced, cannot be reproduced and output.

FIG. 2 shows a problem which is caused due to influence by the DC component. There is a case where in 1–7 modulation or the like, a reproduction waveform as shown in the diagram appears in dependence on a modulation pattern. In such a case, although no problem occurs in block B, in case of block A, if the center value of the peak and bottom values is set to a slice level, a correct pulse width cannot be reproduced.

As a measure for solving the above problems, an optical information reproducing apparatus shown in FIG. 3 has been proposed. In FIG. 3, reference numeral 51 denotes a peak-hold circuit; 52 a bottom-hold circuit; 53 a center level detection circuit; 54 a comparator; 55 a leading edge detection circuit; 56 a trailing edge detection circuit; 57 and 59 phase locked loop (PLL) circuit; 60 and 61 synchronous circuits; 62 and 63 first-in first-out memory circuits (FiFo circuits); and 64 a data composition circuit.

In the apparatus of FIG. 3, a center value which is detected by the center level detection circuit 53 from outputs of the peak-hold circuit 51 and bottom-hold circuit 52 is set to a slice level and a binarization is coarsely performed by the comparator 54. Different PLLs are applied at the leading and trailing edges of a binary signal and the resultant reproduction data is inputted to the FiFo circuits 62 and 63. Subsequently, by reading out the reproduction data by a clock which is generated on the controller side, a fluctuation in recording power, a fluctuation in amplitude, and an influence by the DC component are reduced.

The conventional apparatus as shown in FIG. 3, however, because a plurality of PLL circuits and FiFo circuits are necessary, is disadvantageous in terms of the costs. There is also a problem in that the use of a plurality of PLL circuits is disadvantageous from the viewpoint of noise or the like in the case of realizing an LSI, or the like.

As another binarizing method different from the apparatus of FIG. 3, as disclosed in JP-A-5-40978, the following method is also proposed. Namely, after the difference signal of the signals from two sensors is binarized on the basis of a predetermined level, a clock signal is extracted from the binary signal, and the slice level is controlled so that the average value of the binary signal synchronized by the clock or the pulse width is equalized to that of the binarizing means.

However, in order to obtain a voltage corresponding to a difference of pulse widths (duty deviation) by differential detection after averaging operation, there was a problem in that it was hard to assure accuracy, for the following reasons.

(1) The difference of an amplitude of a binary signal to be compared and that of the synchronized binary signal would impart an extremely large error in comparison to the voltage corresponding to the difference of the pulse widths desired to be detected. For this reason, it is necessary to make the difference of the amplitudes extremely small.

(2) It is necessary to set a time constant so as not to saturate an averaging circuit with respect to an input signal. However, under condition of such a time constant, the voltage to be detected as a difference of pulse widths is extremely small. This is because the difference of the pulse widths desired to be detected is extremely small in comparison to the pulse width.

In the case of averaging the signals and asynchronously using the average output for the slice level control as mentioned above, a time constant for the averaging process must be large so as not to cause an oscillation phenomenon. There is consequently a problem in that a time delay occurs in the detection of a duty deviation and the automatic slice level control cannot be performed at a high speed.

The present invention is made in consideration of the above problems and it is an object of the invention to provide an optical information reproducing apparatus which can reproduce an accurate magnetooptical signal and can perform a binarization of a high response speed and a high precision irrespective of complicated fluctuations in level of a reproduction signal and a duty due to a change in writing level or the like of the magnetooptical signal.

SUMMARY OF THE INVENTION

To accomplish the above object, according to the present invention, there is provided an information reproducing apparatus having first comparing means for comparing a reproduction signal from an information recording medium and a first reference signal, thereby binarizing, clock signal generating means for generating a clock signal from a signal binarized by the first comparing means, and synchronous means for synchronizing the binary signal by the clock signal, wherein the information reproducing apparatus comprises: phase comparing means for comparing a phase of the binary signal and a phase of an output of the synchronous means; a charge/discharge circuit which is driven by an output of the phase comparing means; second comparing means for comparing an output of the charge/discharge circuit and a second reference signal; and control means for controlling the first reference signal by an output of the second comparing means synchronously with the binary signal or an output of the synchronous means.

According to the invention, there is provided an information reproducing method having a step of comparing a reproduction signal from an information recording medium and a first reference signal, thereby binarizing the reproduction signal and a step of generating a clock signal from the binary signal and synchronizing the binary signal by the clock signal, wherein the information reproducing method comprises: a first comparing step of comparing a phase of the binary signal and a phase of the synchronized signal; a step of charging or discharging in accordance with a signal outputted in the first comparing step; a second comparing step of comparing a voltage generated by the charge or discharge and a second reference signal; a step of synchronizing a signal outputted in the second comparing step with the binary signal or the synchronized signal; and a step of controlling the first reference signal by a signal outputted in the synchronizing step.

BRIEF DESCRIPTION OF THE DRAWINGS

FIGS. 1A to 1C are waveform diagrams showing changes in reproduction signal when a writing level of a magnetooptical signal is changed;

FIG. 2 is a waveform diagram for explaining problems which occur due to an influence by a DC component in a conventional binarizing method;

FIG. 3 is a block diagram showing an example of a construction of a conventional optical information reproducing apparatus;

FIGS. 5A to 5E are diagrams showing a signal waveform in each section in the apparatus of FIG. 4;

FIG. 6 is a diagram for explaining a format of a recording medium which is used in the apparatus of FIG. 4;

FIG. 7 is a diagram showing a signal waveform in each section in the apparatus of FIG. 4;

DETAILED DESCRIPTION OF THE PREFERRED EMBODIMENTS

Embodiments of the present invention will now be described in detail hereinbelow with reference to the drawings.

Figure 4:
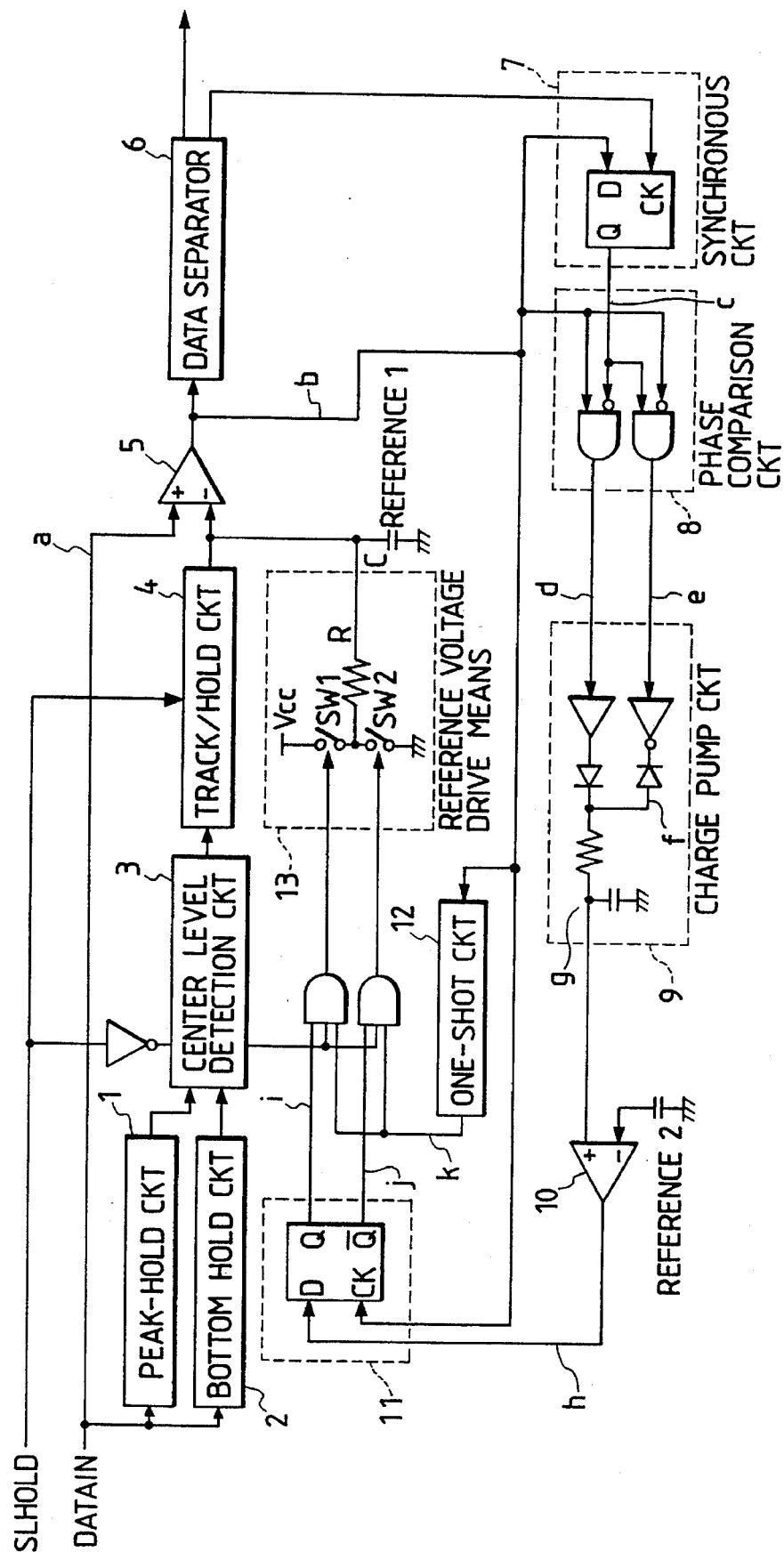
FIG. 4 is a block diagram showing the first embodiment of an optical information reproducing apparatus of the present invention.

FIG. 4 is a block diagram showing the first embodiment of an optical information reproducing apparatus of the invention. In FIG. 4, a DATAIN signal (a) is a reproduction signal of a mark edge format which is obtained by a method whereby a reproduction signal reproduced by an optical head (not shown) is amplified by a preamplifier (not shown) and is subsequently waveform equalized.

Reference numeral 1 denotes a peak-hold circuit for detecting a positive peak of the reproduction signal (a) and holding it by a predetermined time constant and detecting a positive envelope; 2 a bottom-hold circuit for detecting a negative peak of the signal (a) and holding it by a predetermined time constant and detecting a negative envelope; 3 a center level detection circuit which is connected to an output of the peak-hold circuit 1 and an output of the bottom-hold circuit 2 and detects a center signal of the above two envelope signals; and 4 a track/hold circuit. As for the center level signal detected by the center level detection circuit 3, in the case where an SLHOLD signal for controlling switching of the tracking (buffering) mode and the hold mode in the track/hold circuit is at the high level, the track/hold circuit 4 operates as a buffer and charges or discharges a capacitor of a first reference voltage shown as a reference 1 and directly outputs the center level signal as it is. In the case where the SLHOLD signal is at the low level, an output of the track/hold circuit is set into a high impedance state and the value so far is held in the capacitor of the first reference voltage.

Reference numeral 5 denotes a first voltage comparator for comparing the reproduction signal and the first reference voltage and converting the reproduction signal to a digital binary signal; 6 a data separator for extracting a clock synchronized with the reproduction signal binarized by the first voltage comparator 5 from such a binary reproduction signal and for supplying the synchronous data converted into the mark position format and the sync clock to a disc controller (not shown) at the next stage; 7 a synchronous circuit for synchronizing the reproduction signal binarized by the voltage comparator 5 with the sync clock from the data separator 6; 8 a phase comparison circuit for comparing a phase of the reproduction signal binarized by the voltage comparator 5 and a phase of a sync binary signal synchronized with the sync clock in the synchronous circuit 7; 9 a charge/discharge circuit (charge pump circuit here, for example) which is charged or discharged on the basis of the comparison result of the phase comparison circuit 8; 10 a second voltage comparator for comparing an output of the charge pump circuit 9 and a second reference voltage; 11 a synchronous circuit for synchronizing an output of the second voltage comparator with a reproduction signal (b) after completion of the binarization; 12 a one-shot circuit which is triggered by a leading edge of the binarized reproduction signal (b) and generates a pulse of a predetermined width; and 13 reference voltage drive means which is controlled by an output of the synchronous circuit 11 and an output of the one-shot circuit 12 and charges or discharges the first reference voltage. The drive means 13 comprises a voltage source, a capacitor C, and a resistor R and switches SW1 and SW2 connected between them. A cut-off frequency that is decided by the values of the resistor R and capacitor C is set to a value which is lower than the highest frequency of the input signal and is higher than 1/20 of the lowest frequency of the input signal.

The operation of the embodiment will now be described.

FIG. 5A is a diagram showing a magnetooptical signal. FIG. 5B is a diagram showing the relation between the magnetooptical signal and the slice level. The slice level has been set to the center value between the peak value and bottom value of the average amplitude of the magnetooptical signal in a manner similar to the conventional apparatus, so that the slice level is not the optimum slice level. FIG. 5C is a diagram showing the binary signal when the magnetooptical signal is binarized by the slice level in FIG. 5B. Since the slice level is improper, an abnormality occurs in the pulse width like waveforms at the center and right positions shown in the diagram.

In such a case, an erroneous operation occurs in a demodulating process at the post stage. Particularly, such an abnormality is remarkable in the pit edge recording. FIG. 5D shows synchronous clocks extracted by the data separator 6. FIG. 5E shows an output of the synchronous circuit 7 as a synchronous output signal which is obtained by synchronizing the binary output of FIG. 5C by the synchronous clock. In this case, it will be understood that the pulse width is constant due to the synchronization.

When the pulse widths in FIGS. 5C and 5D are equal, the slice level is proper. According to the invention, therefore, the slice level is controlled at a high speed so as to equalize the binary output and the synchronous output, thereby always maintaining the slice level at the optimum value and accurately reproducing the reproduction signal.

The operation of the embodiment will be described in detail on the basis of the principle discussed above.

As a signal which is reproduced from the optical disc, a header portion in which information such as a position of a sector on the disc and the like has previously been recorded in recess and projection forms and a data portion in which information is recorded in a magnetooptical disc or the like are reproduced in a form as shown in part (a) in FIG. 6. Part (b) in FIG. 6 shows a typical example of a format of the reproduction signal. A sector mark (SM) indicative of the head position of the sector is recorded at the head of the header portion. A VFO pattern to pull in the PLL is subsequently recorded. The VFO pattern is formed by repeating a predetermined pattern (in case of the mark edge recording, a duty ratio is ideally set to 50%) and has a length of about 20 bytes. After that, address information, an address mark signal indicative of the start position thereof, and the like are recorded. A plurality of combinations of such VFO and ID are recorded. In the data portion, prior to data to be recorded, a VFO to pull in the PLL, a SYNC pattern to detect the head position of the data, and the like are recorded.

As shown in FIG. 6, the SLHOLD signal to control the track/hold circuit 4 is set to the high level in the header and the head Portion of the VFO pattern of the data portion. When the SLHOLD signal is at the high level, the track/hold circuit is in a buffer state as mentioned above. Therefore, the center level of the peak-to-peak signal of the reproduction signal formed by the peak-hold circuit and bottom-hold circuit is supplied as a slice level to a first reference voltage. At this stage, although the slice level is not perfectly accurate, it is set to a level at which the coarse operation can be performed, so that the operation to pull in the PLL and the like can be executed. When the SLHOLD signal is at the high level, AND gates to control the switches SW1 and SW2 in the reference voltage drive means 13 are closed by the inverted signal of the SLHOLD signal. Therefore, charge or discharge of the reference voltage 1 by the reference voltage drive means 13 is not executed. Those switches are in a high impedance state, and only the control from the track/hold circuit 4 is executed. After that, when the SLHOLD signal is set to the low level, the track/hold circuit 4 enters a holding state and an output of the track/hold circuit 4 is set to a high impedance state. A control loop from the track/hold circuit 4 is turned off. A feedback control loop from the reference voltage drive means 13 is activated. A data slice mode is set into an auto duty tracking mode. In the auto duty tracking mode, a duty cycle of the reproduction binary signal is compared with a duty cycle of the synchronous binary signal synchronized by a read clock and is controlled so as to equalize those duty cycles.

The auto duty tracking mode will now be described in detail hereinbelow with reference to FIGS. 4 and 7.

FIG. 7 shows a signal waveform in each section of the apparatus of FIG. 4. Parts (b) to (l) in FIG. 7 show waveforms of signals (b) to (l) shown in FIG. 4. As shown in (b) and (c), the reproduction binary signal and the synchronous binary signal are the signals whose phases are slightly deviated. By comparing those phases by the phase comparator 8, a difference between both of the duty cycles is expressed as a change in widths of charge and discharge pulses to the charge pump circuit 9 as shown in (d) and (e).

When the duty cycles of the two signals are equal, the pulse widths of the charge pulse and discharge pulse are equal and the output level of the charge pump circuit 9 is set to an almost constant value. When the duty ratio of the reproduction binary signal is smaller than that of the synchronous binary signal (the high level portion of (b) in FIG. 7 is narrow), the pulse width on the charging side is narrower than the pulse width on the discharging side. In the case opposite to the above case, the pulse width on the discharging side is narrower than the pulse width on the charging side. As mentioned above, the balance of the charge and discharge is shifted due to a difference of the duty ratios and the output is generated as the voltage according to the difference of the duty ratio.

Part (g) in FIG. 7 shows the detailed portion of the output voltage of the charge pump circuit 9.

As shown in (g) in FIG. 7, the output voltage of the charge pump circuit 9 is not a perfectly smooth signal but is a combination of signals like trapezoids each having a predetermined inclination in the portion to discharge. This is because the time constant of the charge pump is set to a small value in order to detect the difference between the duties of two signals at a high speed. A fairly large change during the charging or discharging operation appears.

A second reference voltage has been preset to a voltage of the bottom side of the trapezoidal portion of the output voltage of the charge pump in the case where the duty cycle of the reproduction binary signal is equal to the duty cycle of the synchronous binary signal. An output of the second voltage comparator 10 is as shown in (h) in FIG. 7. This output signal is constructed in a form such that the output of the second voltage comparator 10 is inputted to the input of the D-type flip-flop and the reproduction binary signal is inputted to the clock and they are synchronized. Outputs of the synchronous circuit 11 are as shown in (i) and (j) in FIG. 7 and are supplied to the AND gates, respectively. The AND gates perform logic operations between the input signals (i) and (j) and an output (k) of the one-shot circuit 12 synchronized with the reproduction binary signal, thereby controlling the switches SW1 and SW2 of the reference voltage drive means 13. As shown in (l) in FIG. 7, the first reference voltage is charged or discharged synchronously with the binary reproduction signal in accordance with the difference between the duties of the reproduction binary signal and the synchronous binary signal, thereby controlling the slice level.

In this connection, the reason why the charge or discharge by the switches SW1 and SW2 is effected synchronously with the binary reproduction signal (or the synchronized binary signal) is as follows.

(1) It is necessary to hold the first reference voltage in order to prevent an erroneous operation in case of absence of the input signal.

(2) Since it results in always evaluating the voltage of the same phase of the trapezoid waveform shown in (g) in FIG. 7 (i.e. detecting as a duty deviation signal), periodical fluctuation components with trapezoid shape can be eliminated (i.e. constituting a kind of filter).

Figure 8:
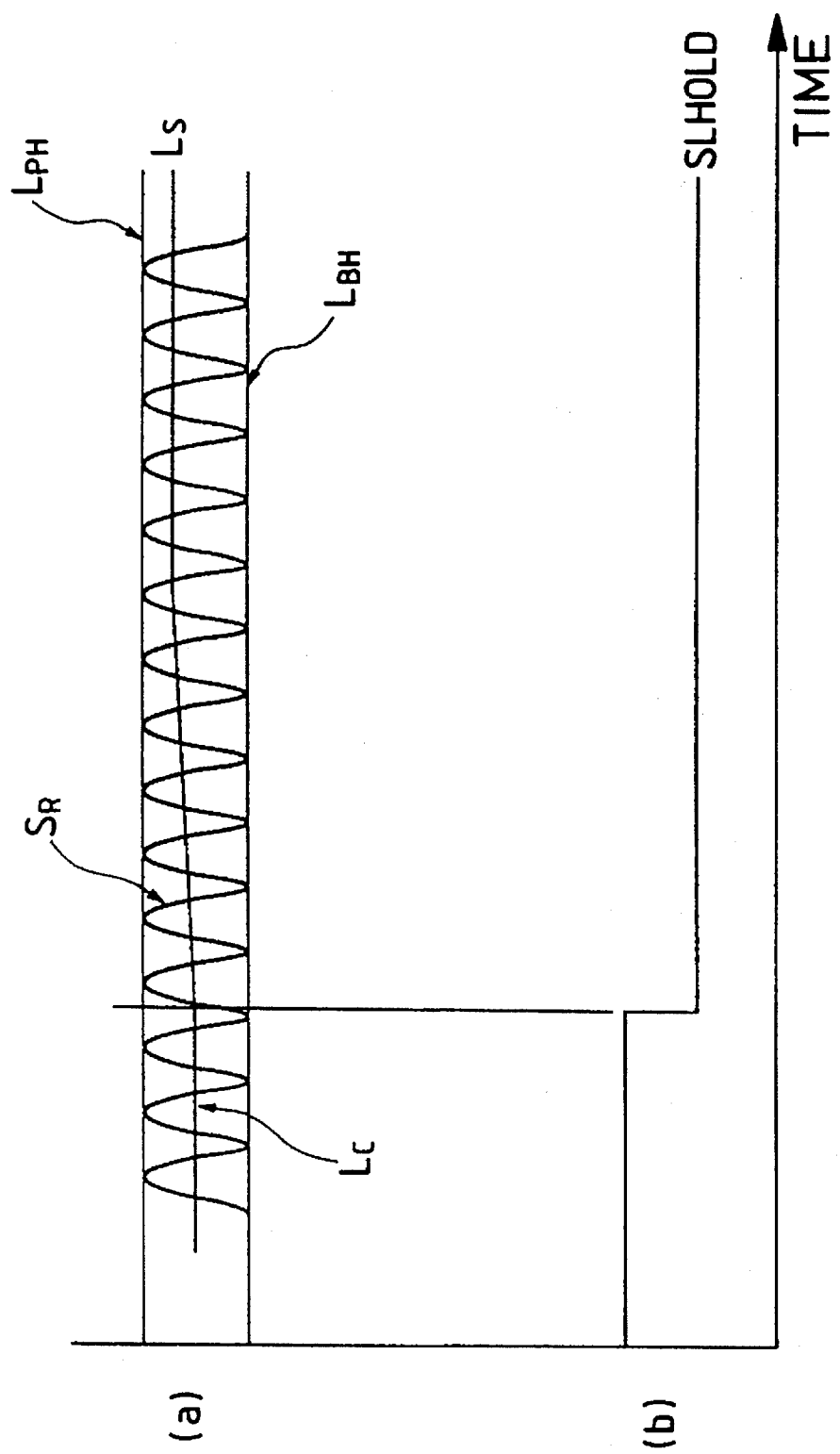
FIG. 8 is a diagram showing a change in slice level in the apparatus of FIG. 4.

The capacitor of the reference voltage 1 serving as a slice level is commonly used for the track/hold circuit 4. Therefore, as shown in FIG. 8, when the SLHOLD signal changes from the high level to the low level, the slice level smoothly changes from the center level of the peak-to-peak to the level which gives the accurate duty cycle. In FIG. 8, $S_R$ denotes a reproduction signal having a DC-like fluctuation or duty fluctuation; $L_{PH}$ a peak-hold level; $L_{BH}$ a bottom-hold level; $L_S$ a slice level; and $L_C$ a center level between the peak and bottom levels.

Figure 9:
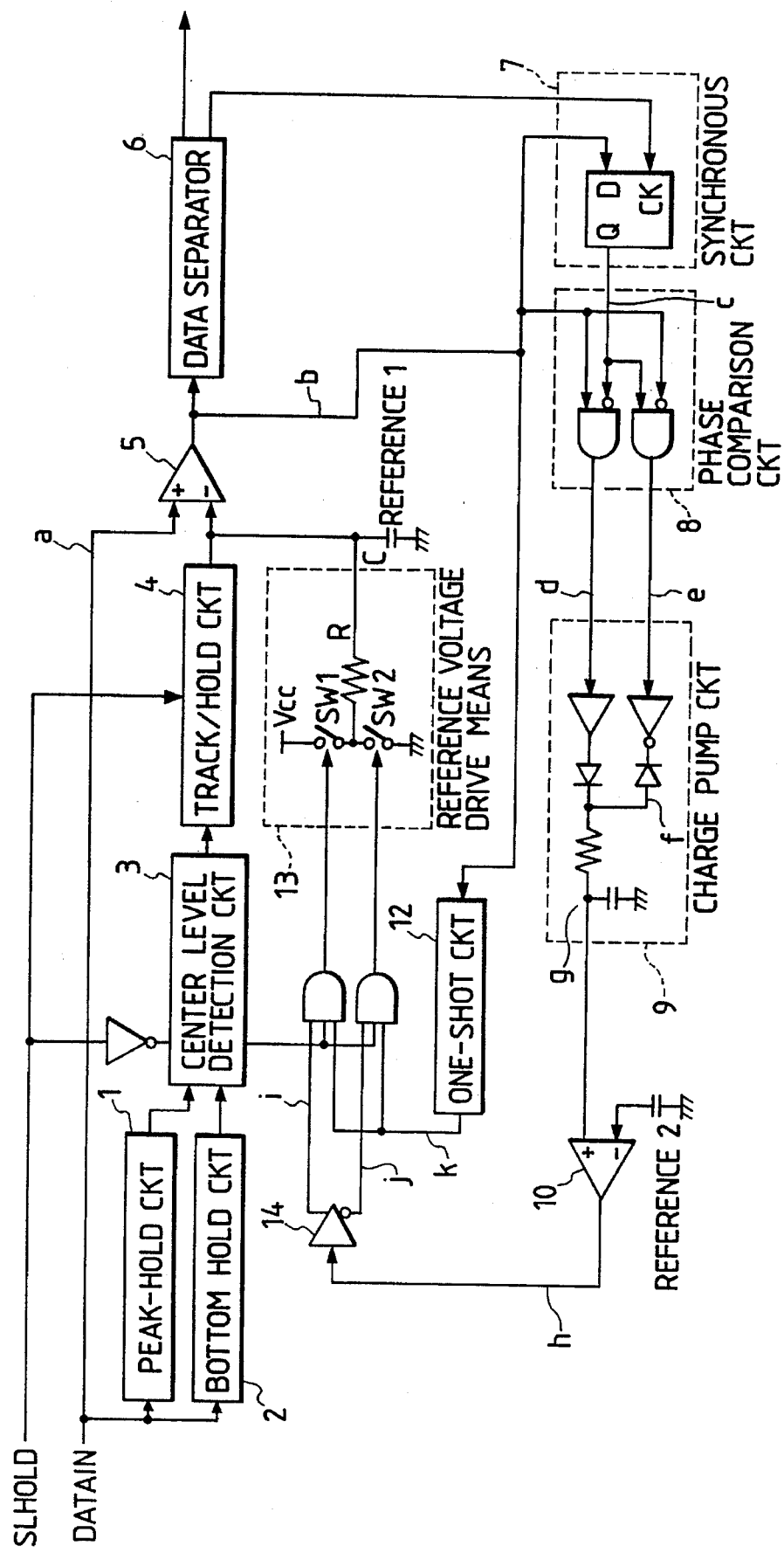
FIG. 9 is a block diagram showing the second embodiment of an optical information reproducing apparatus of the invention.

FIG. 9 shows a block diagram of the second embodiment of the invention. In FIG. 9, the same component elements as those shown in FIG. 4 are designated by the same reference numerals and their detailed descriptions are omitted. In the second embodiment, in place of the synchronous circuit 11, the output of the voltage comparator 10 is converted to the differential output and is inputted to the front gate of the reference voltage drive means 13. The other circuit constructions are substantially similar to those in the apparatus of FIG. 4. In the present embodiment, whether the first reference voltage shown at the reference 1 is charged or discharged is determined in accordance with whether the output of the voltage comparator 10 is at the high level or the low level. The first reference voltage is charged or discharged synchronously with the output (k) of the one-shot circuit 12.

Figure 10:
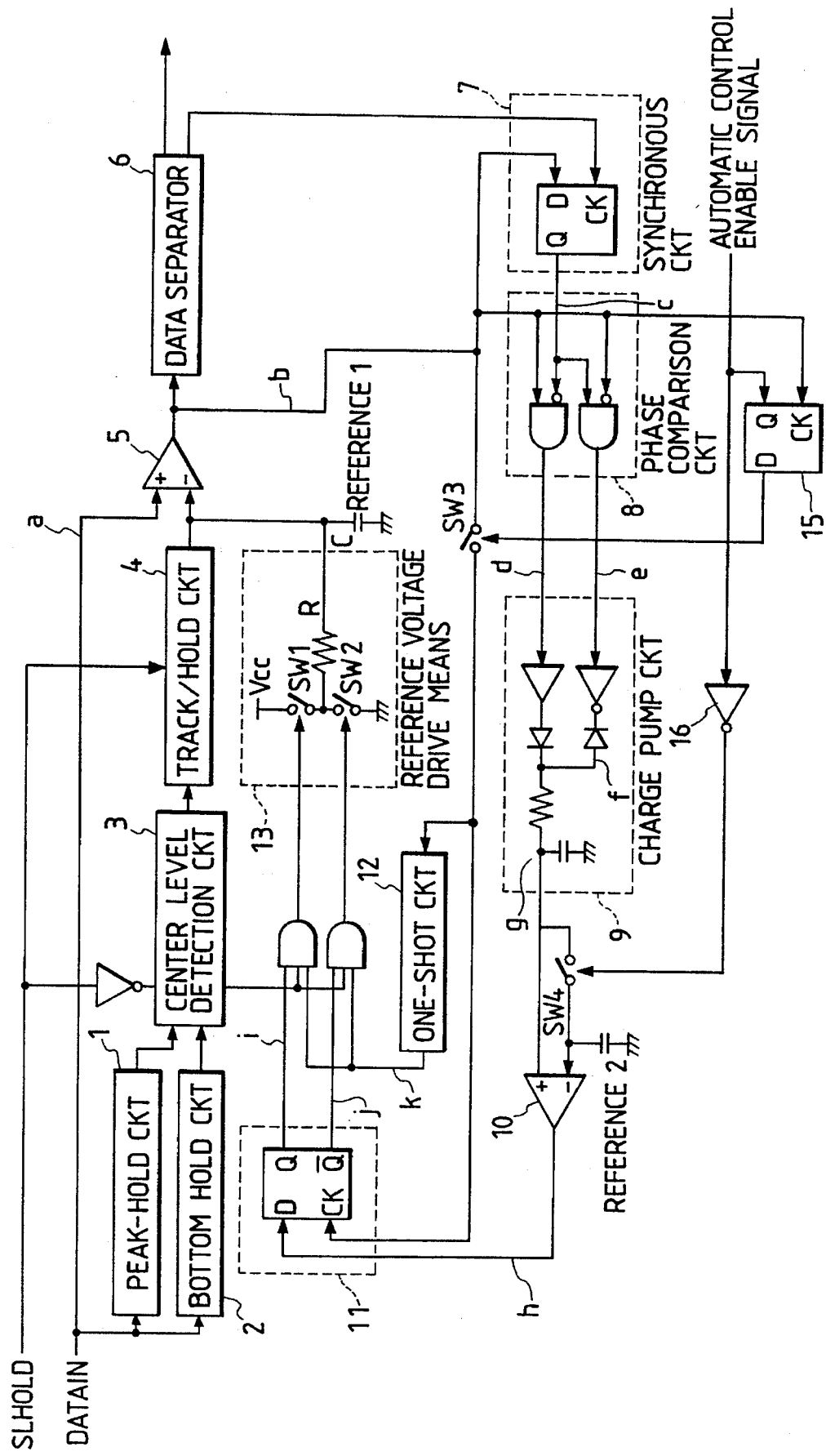
FIG. 10 is a block diagram showing the third embodiment of an optical information reproducing apparatus of the invention.

FIG. 10 shows a block diagram of the third embodiment of the invention. In FIG. 10, the same component elements as those shown in FIG. 4 are designated by the same reference numerals and their detailed descriptions are omitted. According to the third embodiment, a control by an auto control enable signal is added to the apparatus of FIG. 4. When the auto control enable signal is set to the low level, the non-inverting input of the voltage comparator 10 is fixed to the second reference voltage by a switch SW4. When the control by the loop is started, the output of the charge pump circuit 9 starts from the second reference voltage. In this state, a switch SW3 is open and the control loop by the charge pump circuit 9 is inoperative.

When the auto control enable signal is set to the high level, the switch SW4 is first opened and the charge or discharge of the charge pump circuit 9 is started and the auto control system is set into an enable state. After that, when the reproduction binary signal is inputted, the switch SW3 is turned on by a D-type flip-flop 15, the charge or discharge to the first reference voltage is started, and the loop of the auto control system is made operative.

Figure 11:
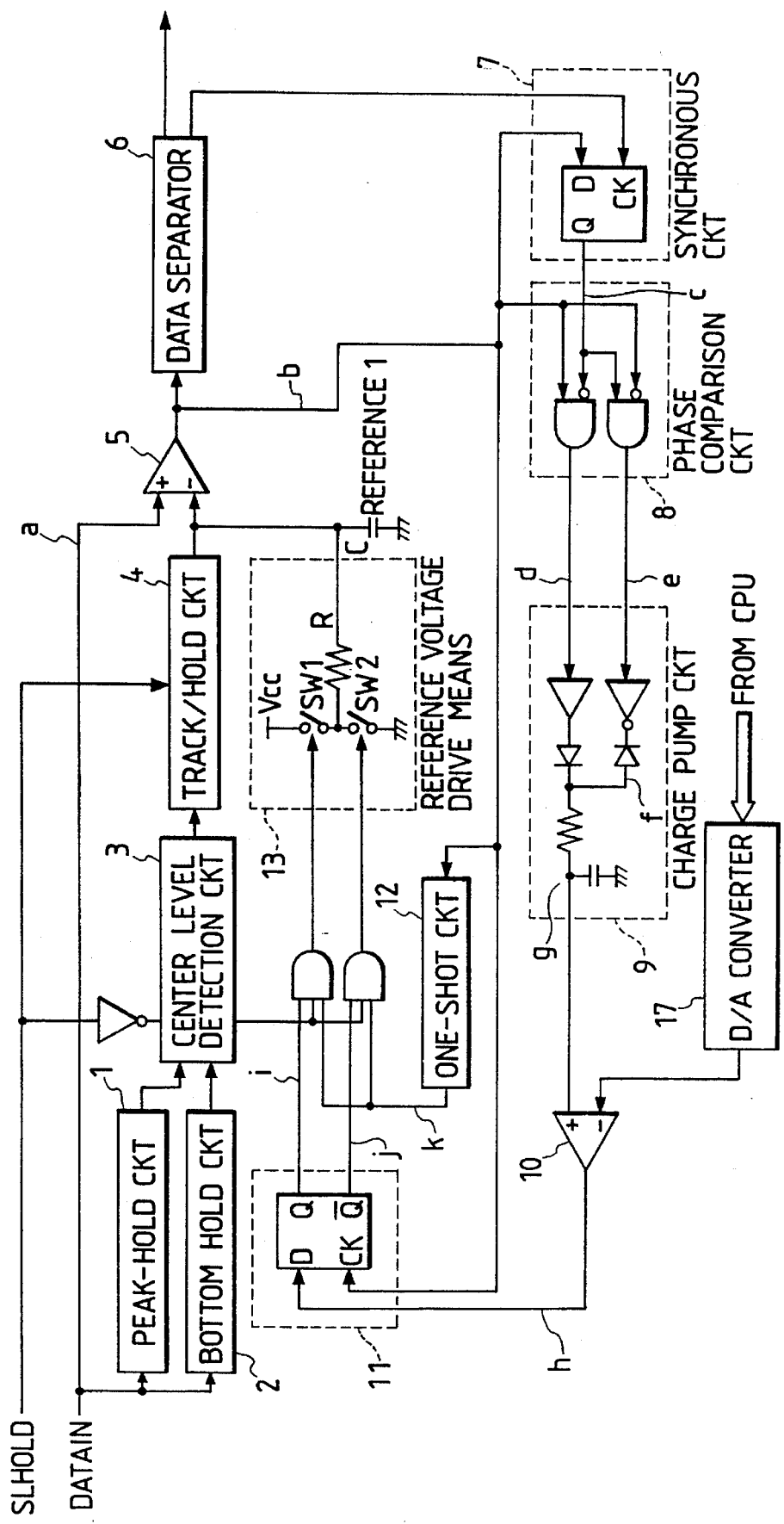
FIG. 11 is a block diagram showing the fourth embodiment of an optical information reproducing apparatus of the invention.

FIG. 11 shows a block diagram of the fourth embodiment of the invention. In FIG. 11, the same component elements as those shown in FIG. 4 are designated by the same reference numerals and their detailed descriptions are omitted. According to the fourth embodiment, the second reference voltage of the apparatus of FIG. 4 is supplied by a D/A converter 17 which is controlled by the CPU. In case of using a recording method, namely, so called a zone bit recording (Z. B. R), whereby a disc is divided into a plurality of zones in the track direction and a recording frequency is increased as the zone approaches the outer peripheral position, so long as values that are common to each zone are used as time constants of CR of the charge pump 9, the widths of charge pulse and discharge pulse change every zone and a height of trapezoid of the output signal of the charge pump as shown in (g) in FIG. 7 changes. Thus, it is necessary to adjust the second reference voltage for every zone. When the duties perfectly coincide, in case of using 5V as Vcc, for example, the center value of the height of the trapezoid portion needs to be set to 2.5V. In this case, data is set from the CPU into the D/A converter 17 every zone or each time a clock rate changes as in case of reproducing a disc of another format or the like, thereby setting the center level to 2.5 V.

Figure 12:
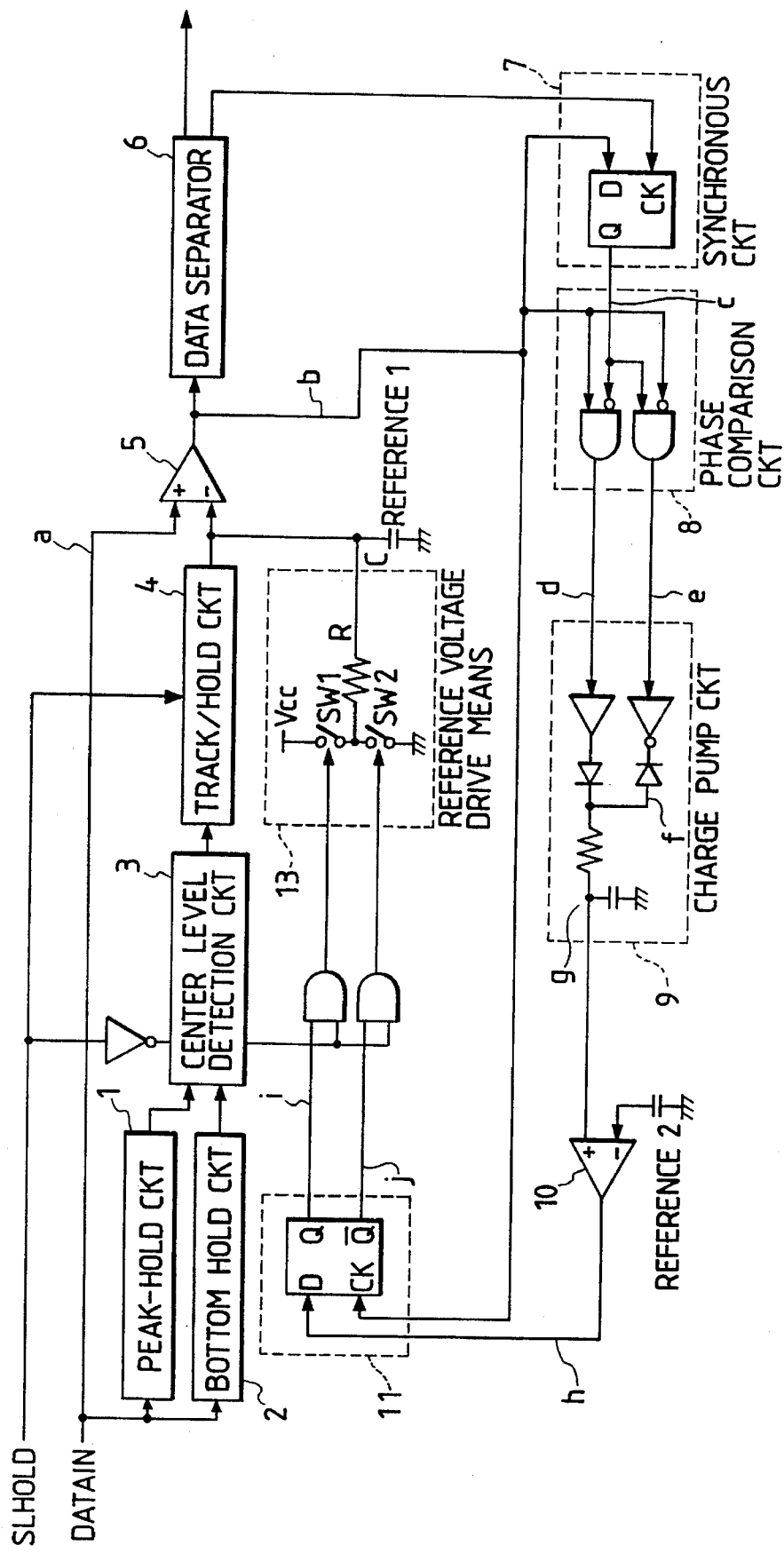
FIG. 12 is a block diagram showing the fifth embodiment of an optical information reproducing apparatus of the invention.

FIG. 12 shows a block diagram of the fifth embodiment of the invention. In FIG. 12, the same component elements as those shown in FIG. 4 are designated by the same reference numerals and their detailed descriptions are omitted. According to the fifth embodiment, the one-shot circuit 12 in the apparatus of FIG. 4 is omitted. Even in such a construction, effects similar to those of the apparatus of FIG. 4 are derived.

Figure 13:
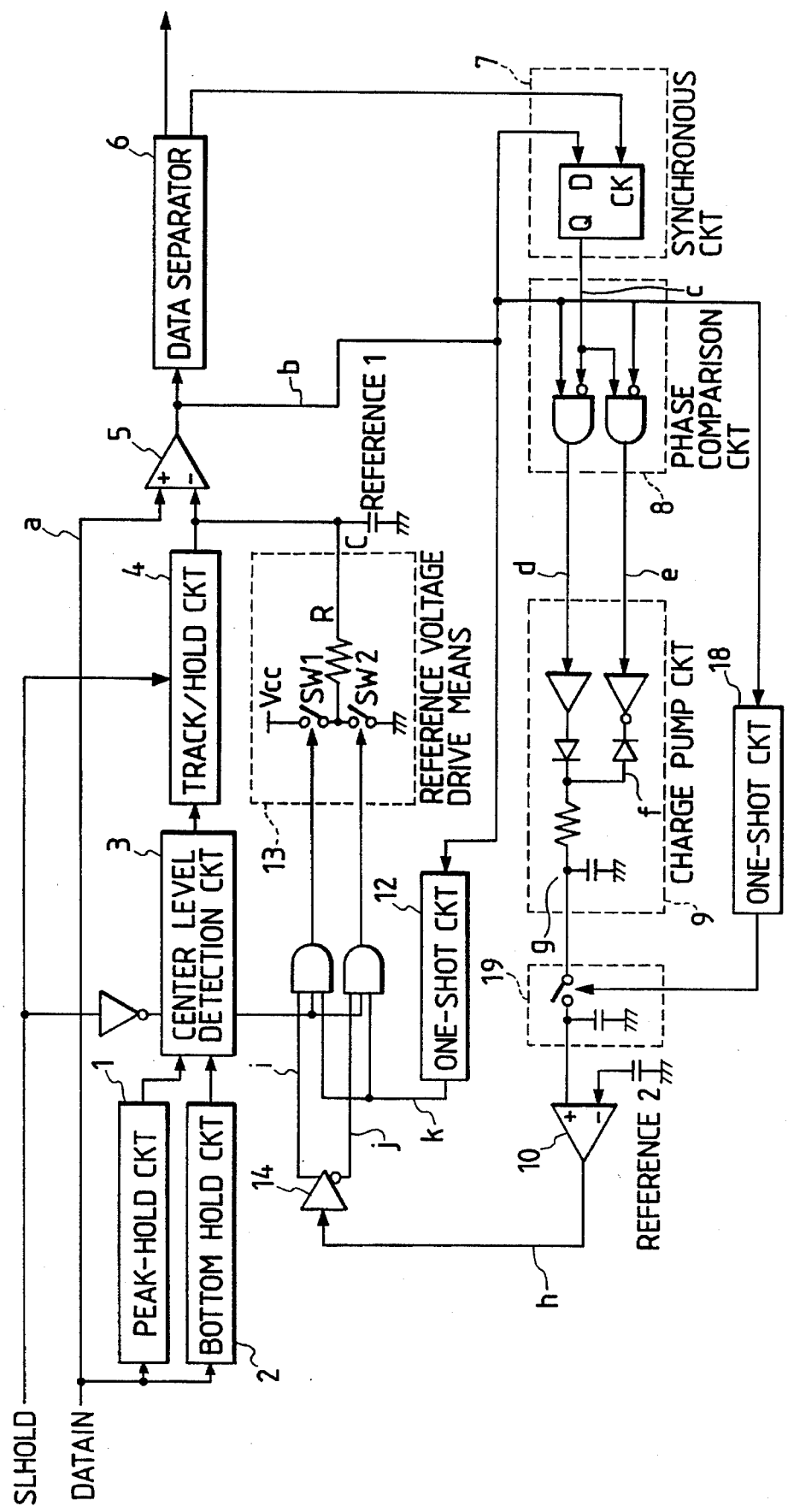
FIG. 13 is a block diagram showing the sixth embodiment of an optical information reproducing apparatus of the invention.

FIG. 13 shows a block diagram of the sixth embodiment of the invention. In FIG. 13, the same component elements as those shown in FIG. 4 are designated by the same reference numerals and their detailed descriptions are omitted. According to the sixth embodiment, the synchronous circuit 11 in the apparatus of FIG. 4 is omitted. In place of it, a sample-hold circuit 19 is provided for the output of the charge pump circuit 9 and the output is sampled and held by a one-shot signal of the reproduction binary signal (b), thereby obtaining effects similar to those of the apparatus in FIG. 4.

Figure 14:
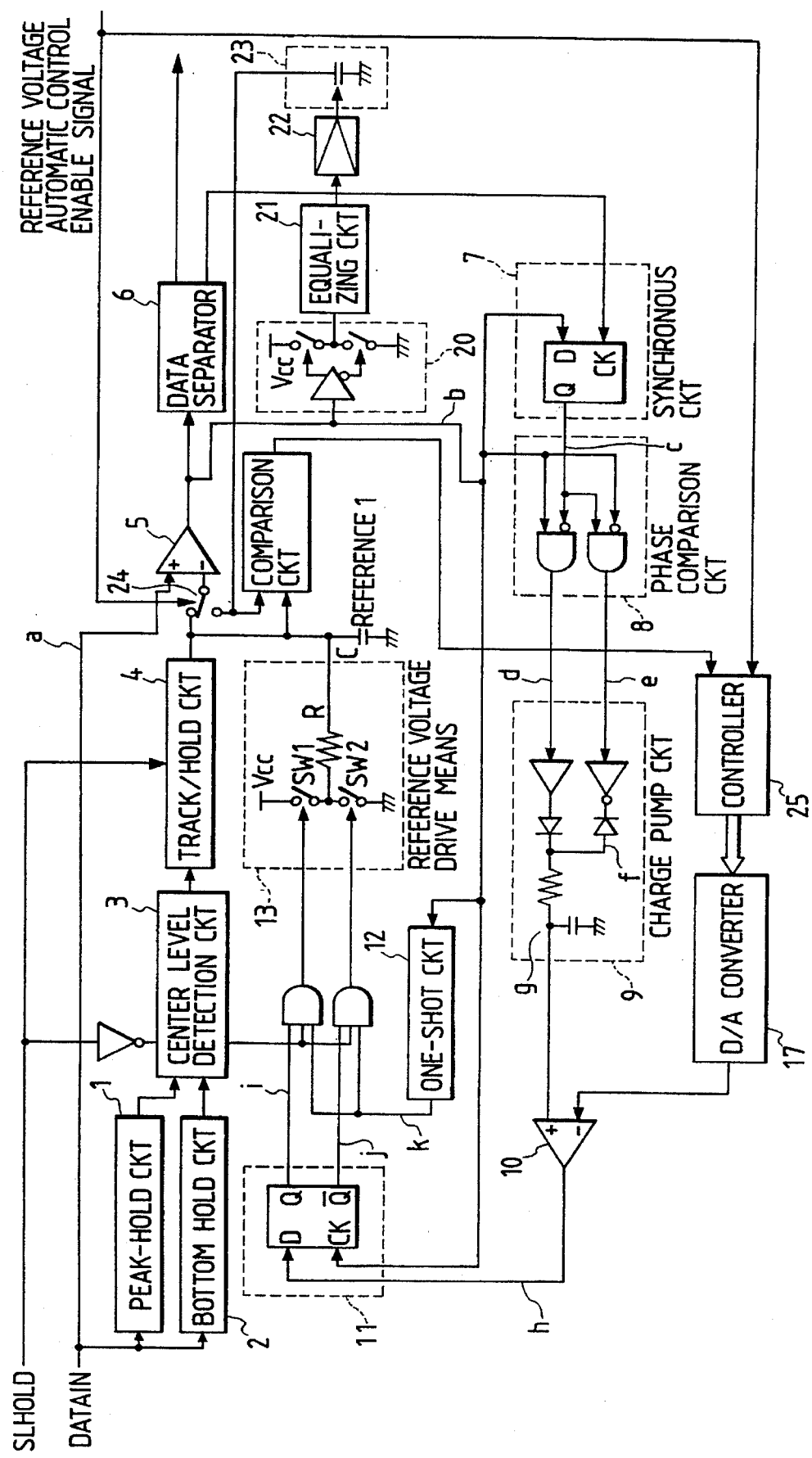
FIG. 14 is a block diagram showing the seventh embodiment of an optical information reproducing apparatus of the invention.

FIG. 14 shows a block diagram of the seventh embodiment of the invention. In FIG. 14, the same component elements as those shown in FIG. 4 are designated by the same reference numerals and their detailed descriptions are omitted. According to the seventh embodiment, in addition to the construction of the apparatus of FIG. 4, a circuit to automatically adjust the second reference voltage shown in FIG. 4 is added. When the reference voltage automatic adjustment is enable, the switch SW 24 is switched to the lower side (opposite to the side shown in the diagram).

In this case, the portion in which a certain repetitive pattern (pattern to be set to the duty of 50% of the reproduction signal) has been recorded is reproduced. The reference voltage of the voltage comparator 5 is supplied from a voltage source 23 which is controlled by a driving amplifier 22. The average value of an output of a charge/discharge circuit 20 which is charged or discharged in accordance with whether the output of the voltage comparator 5 is at the low level or the high level is inputted to the driving amplifier 22. A feedback loop is constructed and the apparatus is feedback controlled so that the duty of the output of the voltage comparator 5 is set to 50%. The voltage of the voltage source 23 at this time is compared with the first reference voltage and the data is set into the D/A converter 17 by a controller 25 so that the first reference voltage is equal to the voltage of the voltage source 23. The reference voltage of the second voltage comparator is adjusted.

The above embodiments have been described on the assumption that the time difference between the binary signal (b) and the output of the synchronous means, namely, the delay time of the synchronous means (data separator 6) is less than the minimum inverting time [for example, 2T in case of the 1–7 RLL (1–7 modulation)] of the binary signal.

Figure 15:
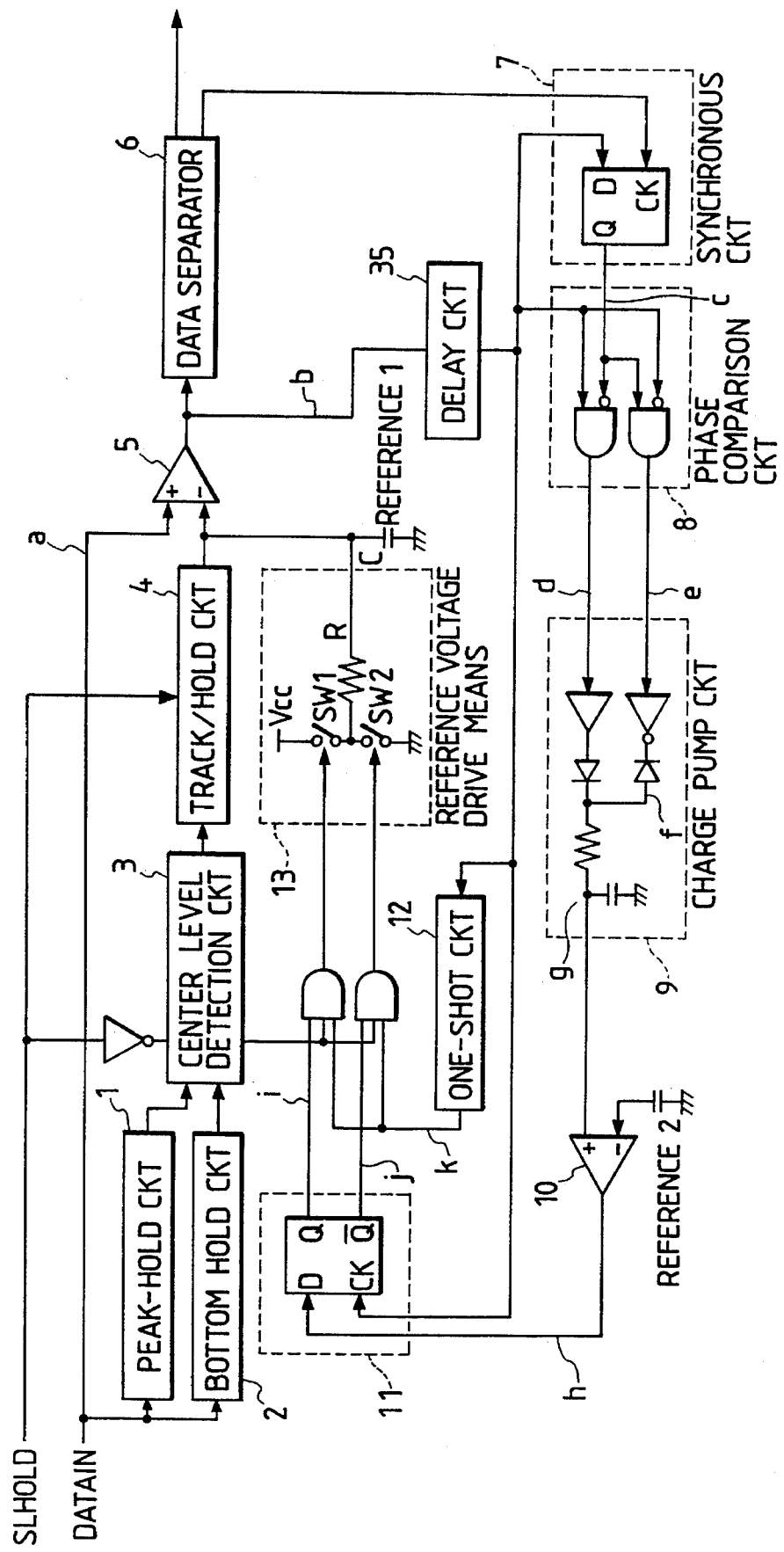
FIG. 15 is a block diagram showing the eighth embodiment of an optical information reproducing apparatus of the invention.

When the delay time of the synchronous means exceeds such a minimum inverting time, as shown in the eighth embodiment of FIG. 15, before the phase of the binary signal (b) is compared with the phase of the output of the synchronous means, the binary signal (b) is delayed by delay means 35 (for example, delay line), thereby setting the time difference between those signals to a value less than the minimum inverting time. Thus, substantially the same effects as those in the foregoing embodiments are obtained.

In the embodiment, any one of the clock signal which is generated from the data separator 6 and the synchronized binary signal may be used as a clock (CK) input of the synchronous circuit 7. However, for example, in the 1–7 RLL, in case of using the clock signal, an edge shift of the binary signal in only a range of up to 1T is permitted because of a limitation of the operation of the present circuit. On the other hand, in case of using the synchronized binary signal is used, an edge shift in a range of up to 2T is permitted, so that it is desirable.

In case of 2–7 RLL, an edge shift in a range of up to 3T is permitted.

As described above, according to the optical information reproducing apparatus of the invention, when the duty ratios or pulse widths of the binary signal binarized by the first reference voltage (reference voltage of the voltage comparator for binarization: slice level) is compared with that of the synchronous binary signal synchronized by the clock signal formed by the binary signal, the charge pump circuit of a small time constant is used. The output of the charge pump circuit is compared with the second reference voltage. The result of the comparison is fed back to the first reference voltage synchronously with the binary signal, thereby setting the slice level. Therefore, the binarization of a high response speed and a high precision can be performed irrespective of the complicated fluctuations in level of the reproduction signal and in duty due to a change in writing level of the magnetooptical signal or the like. The accurate magnetooptical signal can be reproduced.

In the embodiments of FIGS. 4, 9, 10, 11, 13, 14, and 15, since the one-shot circuit 12 has been provided, it is possible to prevent that the relation between the deviation amount of the slice level and the reference voltage drive means is influenced from the signal other than the signal indicative of the result of the phase comparison due to the fluctuation in slice level such as a transfer rate of the input signal or the like. The control precision of the slice level can be raised.

What is claimed is:

1. An information reproducing apparatus having first comparing means for comparing a reproduction signal from an information recording medium and a first reference signal, thereby performing a binarization, clock signal generating means for generating a clock signal from the signal binarized by said first comparing means, and synchronous means for synchronizing said binary signal by said clock signal, comprising:

phase comparing means for comparing a phase of said binary signal and a phase of said synchronous means;

a charge/discharge circuit which is driven by an output of said phase comparing means; and second comparing means for comparing an output of said charge/discharge circuit and a second reference signal, wherein said first reference signal is controlled by an output of said second comparing means synchronously with said binary signal or the output of said synchronous means.

2. An apparatus according to claim 1, wherein said charge/discharge circuit is a charge pump circuit.

3. An apparatus according to claim 1, wherein said second reference signal changes in an interlocking relation with a change in frequency of said clock signal generating means.

4. An apparatus according to claim 1, further comprising delay means for delaying said binary signal.

5. An information reproducing apparatus having first comparing means for comparing a reproduction signal from an information recording medium and a first reference signal, thereby performing a binarization, clock signal generating means for generating a clock signal from the signal binarized by said first comparing means, and synchronous means for synchronizing said binary signal by said clock signal, comprising:

phase comparing means for comparing a phase of said binary signal and a phase of said synchronous means;

a charge/discharge circuit which is driven by an output of said phase comparing means; and second comparing means for comparing an output of said charge/discharge circuit and a second reference signal, wherein said first reference signal is controlled by an output of said second comparing means synchronously with said binary signal or the output of said synchronous means, wherein said charge/discharge circuit is a charge pump circuit, and wherein said apparatus operates in response to an enable signal for permitting the control of said first reference signal and an output signal of said charge pump circuit is reset to said second reference signal for a period of time during which the control of said first reference signal is not permitted.

6. An information reproducing apparatus having first comparing means for comparing a reproduction signal from an information recording medium and a first reference signal, thereby performing a binarization, clock signal generating means for generating a clock signal from the signal binarized by said first comparing means, and synchronous means for synchronizing said binary signal by said clock signal, comprising:

phase comparing means for comparing a phase of said binary signal and a phase of said synchronous means;

a charge/discharge circuit which is driven by an output of said phase comparing means;

second comparing means for comparing an output of said charge/discharge circuit and a second reference signal;

a feedback loop for controlling said first reference signal so that a signal recorded at a duty ratio of 50% is reproduced at a duty ratio of 50%; and adjusting means for automatically adjusting said second reference signal so that a value of said first reference signal which is controlled by said feedback loop is equalized to a value of said first reference signal which is controlled by the output of said second reference signal, wherein said first reference signal is controlled by an output of said second comparing means synchronously with said binary signal or the output of said synchronous means.

7. An apparatus according to claim 6, wherein said information recording medium has a disk-like shape having a plurality of zones which are distinguished by a radial direction, and the value of said second reference signal derived by said adjusting means is stored every zone.

8. An information reproducing apparatus having first comparing means for comparing a reproduction signal from an information recording medium and a first reference signal, thereby performing a binarization, clock signal generating means for generating a clock signal from the signal binarized by said first comparing means, and synchronous means for synchronizing said binary signal by said clock signal, comprising:

phase comparing means for comparing a phase of said binary signal and a phase of said synchronous means;

a charge/discharge circuit which is driven by an output of said phase comparing means;

second comparing means for comparing an output of said charge/discharge circuit and a second reference signal; and a one-shot circuit which is triggered by a leading edge of said binary signal and generates a pulse of a predetermined width, wherein said first reference signal is controlled by an output of said second comparing means synchronously with said binary signal or the output of said synchronous means.

9. An information reproducing apparatus having first voltage comparing means for comparing a reproduction signal from an information recording medium and a first reference voltage, thereby performing a binarization, clock signal generating means for generating a clock signal from the signal binarized by said first voltage comparing means, and synchronous means for synchronizing said binary signal by said clock signal, comprising:

phase comparing means for comparing a phase of an output of said binary signal and a phase of an output of said synchronous means;

a charge/discharge circuit which is driven by an output of said phase comparing means;

second voltage comparing means for comparing an output of said charge/discharge circuit and a second reference voltage;

synchronous means for synchronizing an output of said second voltage comparing means with said binary signal or the output of said synchronous means; and control means for controlling said first reference voltage by an output of said synchronous means.

10. An apparatus according to claim 9, wherein said charge/discharge circuit is a charge pump circuit.

11. An apparatus according to claim 9, wherein said second reference voltage changes in an interlocking relation with a change in frequency of said clock signal forming means.

12. An apparatus according to claim 9, further comprising delay means for delaying said binary signal.

13. An information reproducing apparatus having first voltage comparing means for comparing a reproduction signal from an information recording medium and a first reference voltage, thereby performing a binarization, clock signal generating means for generating a clock signal from the signal binarized by said first voltage comparing means, and synchronous means for synchronizing said binary signal by said clock signal, comprising:

phase comparing means for comparing a phase of an output of said binary signal and a phase of an output of said synchronous means;

a charge/discharge circuit which is driven by an output of said phase comparing means;

second voltage comparing means for comparing an output of said charge/discharge circuit and a second reference voltage;

synchronous means for synchronizing an output of said second voltage comparing means with said binary signal or the output of said synchronous means; and control means for controlling said first reference voltage by an output of said synchronous means, wherein said control means has a voltage source, a capacitor, and a resistor and switches inserted between them, and a cut-off frequency which is caused by said resistor and said capacitor is set to be lower than a highest frequency of an input signal to said control means and is higher than 1/20 of a lowest frequency of the input signal to said control means.

14. An information reproducing apparatus having first voltage comparing means for comparing a reproduction signal from an information recording medium and a first reference voltage, thereby performing a binarization, clock signal generating means for generating a clock signal from the signal binarized by said first voltage comparing means, and synchronous means for synchronizing said binary signal by said clock signal, comprising:

phase comparing means for comparing a phase of an output of said binary signal and a phase of an output of said synchronous means;

a charge/discharge circuit which is driven by an output of said phase comparing means;

second voltage comparing means for comparing an output of said charge/discharge circuit and a second reference voltage;

synchronous means for synchronizing an output of said second voltage comparing means with said binary signal or the output of said synchronous means; and control means for controlling said first reference voltage by an output of said synchronous means, wherein said charge/discharge circuit is a charge pump circuit, and wherein said apparatus operates in accordance with an enable signal for permitting the control of said first reference voltage, and an output voltage of said charge pump circuit is reset to said second reference voltage for a period of time during which the control of said first reference voltage is not permitted.

15. An information reproducing apparatus having first voltage comparing means for comparing a reproduction signal from an information recording medium and a first reference voltage, thereby performing a binarization, clock signal generating means for generating a clock signal from the signal binarized by said first voltage comparing means, and synchronous means for synchronizing said binary signal by said clock signal, comprising:

phase comparing means for comparing a phase of an output of said binary signal and a phase of an output of said Synchronous means;

a charge/discharge circuit which is driven by an output of said phase comparing means;

second voltage comparing means for comparing an output of said charge/discharge circuit and a second reference voltage;

synchronous means for synchronizing an output of said second voltage comparing means with said binary signal or the output of said synchronous means;

control means for controlling said first reference voltage by an output of said synchronous means;

a feedback loop for controlling said first reference voltage so that a signal recorded at a duty ratio of 50% is reproduced at a duty ratio of 50%; and adjusting means for automatically adjusting said second reference voltage so that a value of said first reference voltage which is controlled by said feedback loop is equalized to a value of said first reference voltage which is controlled by the output of said second voltage comparing means.

16. An apparatus according to claim 15, wherein said information recording medium has a disk-like shape having a plurality of zones which are distinguished by a radial direction, and the value of said second reference voltage obtained by said adjusting means is stored every zone.

17. An information reproducing apparatus having first voltage comparing means for comparing a reproduction signal from an information recording medium and a first reference voltage, thereby performing a binarization, clock signal generating means for generating a clock signal from the signal binarized by said first voltage comparing means, and synchronous means for synchronizing said binary signal by said clock signal, comprising:

phase comparing means for comparing a phase of an output of said binary signal and a phase of an output of said synchronous means;

a charge/discharge circuit which is driven by an output of said phase comparing means;

second voltage comparing means for comparing an output of said charge/discharge circuit and a second reference voltage;

synchronous means for synchronizing an output of said second voltage comparing means with said binary signal or the output of said synchronous means;

control means for controlling said first reference voltage by an output of said synchronous means; and a one-shot circuit which is triggered by a leading edge of said binary signal and generates a pulse of a predetermined width.

18. An information reproducing method having a step of comparing a reproduction signal from an information recording medium and a first reference signal, thereby binarizing said reproduction signal, a step of generating a clock signal from said binary signal, and a step of synchronizing said binary signal by said clock signal, comprising:

a first comparing step of comparing a phase of said binary signal and a phase of said synchronized signal;

a step of performing a charge or discharge in accordance with the signal outputted in said first comparing step;

a second comparing step of comparing the voltage generated by said charge or discharge and a second reference signal;

a step of synchronizing the signal outputted in said second comparing step and said binary signal or said synchronized signal; and a step of controlling said first reference signal by the signal outputted in said synchronizing step.

* * * * *

UNITED STATES PATENT AND TRADEMARK OFFICE
CERTIFICATE OF CORRECTION

PATENT NO. : 5,592,456
DATED : January 7, 1997
INVENTOR(S) : AKIRA MIYASHITA, ET AL.

It is certified that error appears in the above-indentified patent and that said Letters Patent is hereby corrected as shown below:

COLUMN 1

Line 24, "edge," should read
--edge recording,--.

COLUMN 6

Line 17, "Portion" should read
--portion--.

COLUMN 9

Line 12, "enable" should read
--enabled--.

UNITED STATES PATENT AND TRADEMARK OFFICE
CERTIFICATE OF CORRECTION

PATENT NO. : 5,592,456

DATED : January 7, 1997

INVENTOR(S) : AKIRA MIYASHITA, ET AL.

It is certified that error appears in the above-identified patent and that said Letters Patent is hereby corrected as shown below:

<u>COLUMN 13</u>

Line 24, "Synchronous" should read --synchronous--.

Signed and Sealed this

Twenty-eighth Day of October, 1997

Attest:

BRUCE LEHMAN

Attesting Officer

Commissioner of Patents and Trademarks